United States Patent [19]
Yatabe et al.

[11] Patent Number: 5,385,412
[45] Date of Patent: * Jan. 31, 1995

[54] ROLLING BEARING

[75] Inventors: Takayuki Yatabe; Fusasuke Goto, both of Kanagawa; Norihiro Aoki, Tokyo; Yoichi Imamura, Hyogo, all of Japan

[73] Assignee: NSK Ltd., Tokyo, Japan

[*] Notice: The portion of the term of this patent subsequent to Feb. 1, 2011 has been disclaimed.

[21] Appl. No.: 101,056

[22] Filed: Aug. 4, 1993

Related U.S. Application Data

[63] Continuation-in-part of Ser. No. 875,405, Apr. 29, 1992, Pat. No. 5,282,689, which is a continuation of Ser. No. 827,036, Jan. 29, 1992, abandoned.

[30] Foreign Application Priority Data

| | | | |
|---|---|---|---|
| Sep. 20, 1991 | [JP] | Japan | 3-241179 |
| Aug. 6, 1992 | [JP] | Japan | 4-210043 |
| Jul. 21, 1993 | [JP] | Japan | 5-200124 |

[51] Int. Cl.⁶ ............................................. F16C 19/00
[52] U.S. Cl. ................................................... 384/492
[58] Field of Search ............... 384/462, 492, 912, 913; 252/12

[56] References Cited

U.S. PATENT DOCUMENTS

| | | | |
|---|---|---|---|
| 4,481,123 | 11/1984 | Hentschel et al. | 252/52 R |
| 4,696,581 | 9/1987 | Tsushima et al. | 384/492 X |
| 4,992,111 | 2/1991 | Yamada et al. | 384/492 X |
| 5,282,689 | 2/1994 | Imamura et al. | 384/492 |

FOREIGN PATENT DOCUMENTS

| | | |
|---|---|---|
| 0064236 | 11/1982 | European Pat. Off. . |
| 0064236 | 11/1982 | European Pat. Off. . |
| 0412476 | 2/1991 | European Pat. Off. . |
| 60-194047 | 10/1985 | Japan . |
| 1-259097 | 10/1989 | Japan . |
| 3-210394 | 9/1991 | Japan . |
| 3-250094 | 11/1991 | Japan . |
| 601604 | 5/1948 | United Kingdom . |
| 615188 | 1/1949 | United Kingdom . |
| 642255 | 8/1950 | United Kingdom . |
| 773118 | 4/1957 | United Kingdom . |
| 2209058 | 4/1989 | United Kingdom . |
| 2235212 | 2/1991 | United Kingdom . |
| 2236762 | 4/1991 | United Kingdom . |
| 2259711 | 3/1993 | United Kingdom . |
| 2260142 | 4/1993 | United Kingdom . |

OTHER PUBLICATIONS

"New Shell Alvania Greases", 1982 (exerpt English translation attached) Shell Product Information, 1983.
"SKF MR Produced Rolling Bearing Steels", *SKF Ball Bearing Journal*, 231(1), 1987.
"Bearing Steel Development", *SKF Ball Bearing Journal Special '89*.
"Rolling Contact Fatigue Life of Various Kinds of Hardness Steels and Influence of Material Factors on Rolling Contact Figure Life", Tsushima et al., 1988.
"Kikai No Kenkyo" (Study on Machines), 40(10), 1988.

*Primary Examiner*—Thomas R. Hannon
*Attorney, Agent, or Firm*—Evenson, McKeown, Edwards & Lenahan

[57] ABSTRACT

A rolling bearing is composed of an outer race having an inner-race raceway on an outer peripheral wall thereof, an outer race having an outer-race raceway on an inner peripheral wall thereof, a plurality of rolling elements interposed for rotation between the outer-race raceway and the inner race, and a lubricant composition filled in a space, which is defined between the inner-race raceway and the outer-race raceway, at a position where the plurality of rolling elements are disposed. The rolling bearing features: (a) at least one of the inner-race and outer-race raceways is made of steel having an oxygen content not higher than 6 ppm; (b) at least a raceway surface of said at least one raceway has been hardened by heat treatment; (c) the lubricant composition comprises as a base oil a synthetic lubricant having a kinematic viscosity of 60–160 cSt at 40° C.; and (d) the lubricant composition further comprises 18–28 wt. % of a thickener which comprises a polyurea compound.

2 Claims, 3 Drawing Sheets

ROLLING BEARING

This application is a continuation-in-part of Ser. No. 07/875,405 filed Apr. 29, 1992, U.S. Pat. No. 5,282,689 which is a continuation of Ser. No. 07/827,036 filed Jan. 29, 1992, abandoned.

BACKGROUND OF THE INVENTION a) Field of the Invention

This invention relates to a rolling bearing suitable for assembly, for example, in an automotive alternator having an aluminum-made housing or an electromagnetic clutch having an aluminum-made shaft so that the rolling bearing sis adapted to support a rotaing part thereof. It is to be noted that the term "aluminum as used herein means aluminum or an aluminum alloy.

b) Description of the Related Art

In a rolling part of an automotive alternator or of an electromagnetic clutch attached to a compressor for an automotive air conditioner, a rolling bearing, for example, such a rolling bearing as shown in FIGS. 1 and 2 is assembled. This rolling bearing is provided with an inner race 2 having an inner-race raceway 1 on an outer peripheral wall thereof, an outer race 4 having an outer-race raceway 3 on an inner peripheral wall thereof, and a plurality of rolling elements (5,5) interposed for rotation between the inner-race raceway 1 and the outer-race raceway 3. These plural rolling elements 5,5 are rotatably held by an annular retainer 6.

Between the outer peripheral wall of the inner race 2 and the inner peripheral wall of the outer race 4, bellow seals 7,7 are provided in a pair, one being at one end portions of the inner and outer races 2,3 and the other at opposite end portions thereof, whereby opposite openings of a space 8 defined between the inner-race raceway 1 and the outer-race raceway 3 are closed. A lubricant composition is filled between the paired seals 7,7 to ensure lubrication between the respective rolling elements 5,5 and the inner-race and outer-race raceways 1, 3.

When such a rolling bearing as described above is assembled in an alternator, the outer race 4 is fitted and fixed in an aluminum-made housing whereas the inner race 2 is fitted on a steel-made drive shaft. The aluminum-made housing however has low rigidity. When the alternator is driven, high load is applied to the housing under engine vibrations and belt tension so that the housing is prone to elastic deformation. As a result, some of the plural rolling elements 5,5 are caused to strongly contact the outer-race raceway 3, that is, so-called complex loading occurs. When the rolling bearing is assembled in an electromagnetic clutch attached to a compressor, the inner race 2 is fitted on an aluminum-made drive shaft of the compressor. When the compressor is driven, the aluminum-made drive shaft therefore undergoes elastic deformation. As a consequence, complex load is applied to the inner-race raceway 1 of the inner race 2. When such complex load is applied to the raceway surfaces (the inner-race race way 1 and the outer-race raceway 3) of bearing rings (the inner race 2 and the outer race 4), the raceway surfaces are susceptible to damage so that the life of the rolling bearing is shortened.

Accordingly, it has heretofore been the practice to make the inner race 2 and the outer race 4 with a bearing steel such as a high-carbon chromium bearing steel having an oxygen content of 9 ppm or so and then to subject raceway surfaces, which are susceptible to damage by the above-mentioned complex load, to standard heat treatment called "whole quench hardening", whereby the rolling contact fatigue strength of the raceway surfaces is improved. In addition, as the lubricant composition filled in the space 8, a lubricant composition comprising as a base oil a synthetic hydrocarbon lubricant such as a synthetic ester lubricant or poly-α-olefin lubricant having a kinematic viscosity of 30–50 cSt at 40° C. and containing 13–17 wt. % of a thickener has been used to protect the raceway surfaces from damage.

Use conditions for a rolling bearing have however become more stringent, because the rolling bearing is subjected to greater load as a result of a higher temperature of a part where a rolling shaft is arranged, a higher revolution speed of the rolling shaft, and higher tension of a belt, all associated with the move toward higher performance of an automobile in recent years. The above-described conventional measure has therefore become insufficient to assure sufficient life in some instances, so that flaking or the like may take place at a relatively early stage on a raceway surface subjected to complex loading.

Keeping step with the move toward a high-performance automobile, an alternator is becoming smaller and its revolution speed is becoming faster. A rolling bearing, such as a ball bearing, assembled in such a small-size and high-rotational-speed alternator to support a rotating part therefore develops premature flaking which is accompanied by a characteristic change in texture totally different from conventional changes in texture. Such premature flaking is considered to take place because the rolling bearing is subjected to high load under engine vibrations and belt tension and, due to the low rigidity of a support portion of the rolling bearing, the races which make up the rolling bearing are repeatedly subjected to bending deformation.

With a view to prolonging the life of rolling bearings, some inventions have been made on the formulation of lubricant as disclosed in Japanese Patent Application Laid-Open (Kokai) Nos. HEI 1-259097, HEI 3-210394 and HEI 3-250094. Even if it is attempted to provide a rolling bearing with better lubrication by the grease compositions disclosed in these patent publication, it is still impossible to sufficiently prolong the life of the rolling bearing when the rolling bearing is under severe conditions. Further, French Patent Publication FR 2681655-A1 and German Patent Publication DE 4217566 A1 disclose inventions, in each of which it is attempted to prolong the life of a rolling bearing by imposing limitations on the kinematic viscosity of a base oil and the oxygen content of steel of races. In the case of the patents disclosed in these patent publications, however, no consideration is made with respect to a thickener so that the rolling bearings disclosed in these patent publications still cannot exhibit any sufficient advantage when they are used under severe conditions.

SUMMARY OF THE INVENTION

An object of the present invention is therefore to provide a rolling bearing which can be assembled, for example, in an automotive alternator having an aluminum-made housing or an electromagnetic clutch having an aluminum-made shaft without developing the above-described drawbacks of the conventional rolling bearings.

In one aspect of the present invention, there is thus provided a rolling bearing composed of an outer race having an inner-race raceway on an outer peripheral wall thereof, an outer race having an outer-race raceway on an inner peripheral wall thereof, a plurality of rolling elements interposed for rotation between the outer-race raceway and the inner race, and a lubricant composition filled in a space, which is defined between the inner-race raceway and the outer-race raceway, at a position where the plurality of rolling elements are disposed. The rolling bearing features:

(a) at least one of the inner-race and outer-race raceways is made of steel having an oxygen content not higher than 6 ppm;

(b) at least a raceway surface of said at least one raceway has been hardened by heat treatment;

(c) the lubricant composition comprises as a base oil a synthetic lubricant having a kinematic viscosity of 60-160 cSt at 40° C.; and (d) the lubricant composition further comprises 18-28 wt. % of a thickener which comprises a polyurea compound.

According to the rolling bearing of the present invention constructed as described above, the lubricant composition forms a lubricant film having a sufficient thickness and cushioning ability between the raceway surfaces and the surface of each rolling element. This lubricant film provides damper effects sufficient to prevent flaking of the raceway surfaces, thereby making it possible to prolong the life of the rolling surface. The present invention can substantially prolong the anti-flaking life of a raceway surface which is subjected to complex loading. It is hence possible to improve the durability and reliability of various equipments having rolling bearings assembled therein.

DETAILED DESCRIPTION OF THE INVENTION AND PREFERRED EMBODIMENTS

Figure 1:
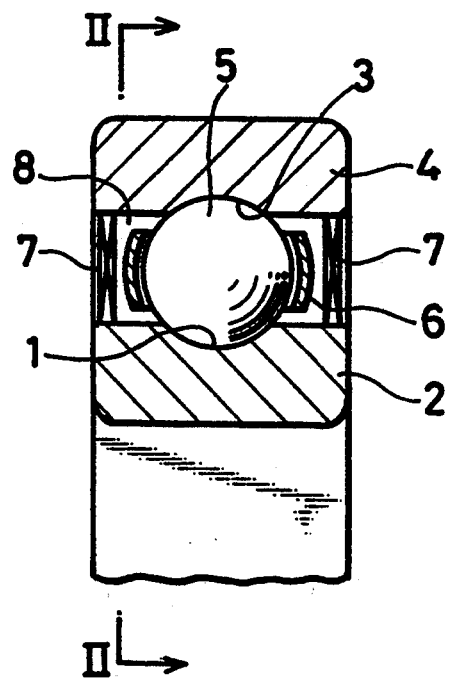
FIG. 1 is a fragmentary cross-section of a rolling bearing according to one embodiment of the present invention.

For the reasons to be described next, the kinematic viscosity of the base oil of the lubricant composition, the content of the thickener and the oxygen content of the steel of the races have been limited to the respective ranges specified above.

The kinematic viscosity of the base oil of the lubricant composition and the content of the thickener have been limited to form a lubricant film having a sufficient thickness and cushioning ability between the raceway surfaces and the surface of each rolling element. Formation of a lubricant film having a sufficient thickness and cushioning ability is needed to ensure lubrication between the raceway surfaces and the surface of each rolling element and, owing to damping effects of the lubricant film, to protect the raceway surfaces from damage such as flaking by complex load applied to the raceway surfaces from the surface of each rolling element even under severe use conditions consisting in combination of high temperature, high speed and high load.

If the kinematic viscosity is lower than 60 cSt, the lubricant composition cannot maintain any sufficient lubricant film, in other words, the lubricant film becomes thinner under the above-described severe conditions and the cushioning ability of the lubricant film also becomes reduced. The life of the rolling bearing therefore becomes insufficient. If the kinematic viscosity conversely exceeds 160 cSt, the agitation resistance of the lubricant composition becomes excessively high so that a rotating member supported by the rolling bearing requires increased drive torque and produces substantial heat upon rotation.

The polyurea compound as a thickener is added so that a lubricant film capable of exhibiting sufficient damping effects can be formed. Contents smaller than 18 wt. % are however too small to draw its effects sufficiently. If the content exceeds 28 wt. %, on the other hand, the lubricant composition becomes so hard that the lubricity is deteriorated. When the rolling bearing is rotated at a high speed, the rolling bearing involves the potential danger that seizure may arise due to poor lubrication when the rolling bearing is rotated at a high speed. The content of the thickener has therefore been limited to 18-28 wt. %, Further, the oxygen content of the steel which forms at least one of the races has been limited to 6 ppm or below and the raceway surface of said at least one race has been hardened by heat treatment. This is to prevent premature flaking from occurring on the raceway surface which is subjected to complex loading.

It is known that premature flaking occurs on a raceway surface by complex load applied thereto and significantly shortens the life of the rolling bearing. As a cause for the occurrence of such premature flaking, impurities in the race-forming steel are believed to have deleterious effects. In the rolling bearing according to this invention, the content of oxygen in the steel has therefore been limited to 6 ppm or less so that the total amount of such impurities is reduced to prevent the above-described premature flaking.

Like general rolling bearings, hardening heat treatment has also been applied to at least the raceway surface which is subjected to complex loading, so that the prevention of premature flaking of the raceway surface can be ensured.

Figure 2:
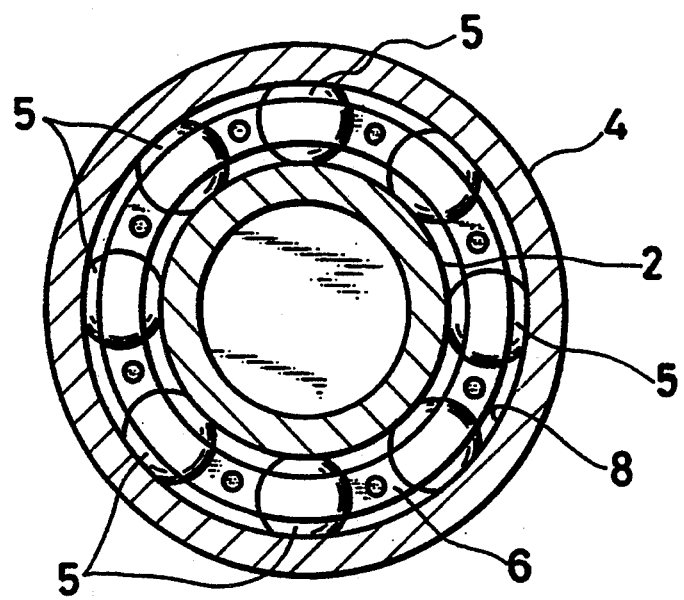
FIG. 2 is a transverse cross-section of the rolling bearing, as viewed in the direction of arrow II—II of FIG. 1.

A description will next be made of experiments which were conducted to confirm the effects of the present invention. The experiments were conducted using such sealed radial ball bearings [JIS (Japanese Industrial Standard) bearing number: 6303] as shown in FIGS. 1 and 2. By changing in various ways the oxygen content of the steel, which formed the outer race 4 of such a sealed radial ball bearing, and also the type of the lubricant composition filled between the paired bellow seals 7,7, it was substantiated how the anti-flaking life of the outer-race raceway 3 subjected to complex loading were affected by the differences in the oxygen content of the steel and in the lubricant composition.

Experiment 1

The inner race 2 of the above ball bearing was fitted and fixed on a steel-made drive shaft of an alternator while the outer race 4 was fitted and fixed in an aluminum-made housing of the alternator. The fixing position was set on a side of a driven pulley mounted on the drive shaft, because the ball bearing is subjected to more complex loading on the side of the driven pulley. A belt was mounted extending between the driven pulley and a driving pulley secured on a crankshaft of an engine, and the drive shaft was driven by the engine.

In the experiment, the revolution speed of the engine was raised from 650 rpm to 6,000 rpm or higher in 3 seconds and, 5 seconds after reaching the highest rpm, was lowered to 650 rpm. This cyclic operation was repeated for 500 hours. The load applied from the belt to the driven pulley was set at 160 kgf. Three samples were provided per each of 8 types, so that 24 samples were provided in total. Each sample was tested in exactly the same manner. Whenever premature flaking takes place on the outer-race raceway 3, the texture of the surface of the outer-race raceway 3 undergoes a change. After the above-described rotational drive was continued for 500 hours, the outer-race raceway 3 was therefore observed to determine if it had undergone any change in texture. The results of Experiment 1 are presented in the following table.

| Sample | Components of lubricant composition | | | Change in texture |
|---|---|---|---|---|
| | Amount of thickener (wt. %) | Base oil | | |
| | | Kind | Kinematic viscosity (cSt) (at 40° C.) | |
| Comp. Ex. 1 | 17 | Synthetic polyol ester lubricant | 32 | Changed (3 samples) |
| Comp. Ex. 2 | 13 | Synthetic hydrocarbon lubricant | 47 | Changed (3 samples) |
| Comp. Ex. 3 | 15 | Diphenylether lubricant | 100 | Changed (1 sample) Unchanged (2 samples) |
| Invention Ex. 1 | 18 | Diphenylether lubricant | 100 | Unchanged (3 samples) |
| Invention Ex. 2 | 20 | Synthetic hydrocarbon lubricant | 100 | Unchanged (3 samples) |
| Invention Ex. 3 | 20 | Diphenylether lubricant | 100 | Unchanged (3 samples) |
| Invention Ex. 4 | 27 | Diphenylether lubricant | 100 | Unchanged (3 samples) |
| Invention Ex. 5 | 18 | Diphenylether lubricant + Synthetic hydrocarbon lubricant | 60 | Unchanged (3 samples) |

Of the eight (8) kinds of lubricant compositions shown in the above table, Comparative Examples 1 to 3 are directed to those having one or both of the content of the thickener (diurea) and the kinematic viscosity of the base oil outside the respective ranges specified in the present invention while Invention Examples 1 to 5 are directed to those having both the content of the thickener and the kinematic viscosity of the base oil within the respective ranges specified in the present invention. As the base oil of the lubricant composition constituting the rolling bearing of Invention Example 5, the polyether lubricant and the synthetic hydrocarbon lubricant were mixed to give the kinematic viscosity specified in the above table.

As is understood from the foregoing, the antiflaking life can be prolonged by using a base oil having a higher kinematic viscosity for a lubricant composition and also increasing the content of a thickener to a certain level or higher in the lubricant composition. This appears to be attributed to greater damper effects available from such a lubricant composition. To confirm this, the present inventors measured the modulus of coefficient of the lubricant composition filled in the rolling bearing of Invention Example 5 and those of the lubricant compositions filled in the rolling bearings of Comparative Examples 1 and 2. The modulus of elasticity of the lubricant composition filled in the rolling bearing of Invention Example 5 was 0.65, whereas those of the lubricant compositions filled in the rolling bearings of Comparative Examples 1 and 2 were 0.85. As a smaller modulus of elasticity is more effective in reducing an impact, the rolling bearing of Invention Example 5 was found to successfully protect the outer-race raceway 3 from flaking owing the damper effects of the lubricant composition. In addition, the present inventors also measured stress applied to the outer race 4 upon changing the revolution speed of the drive shaft. As a result, it was also confirmed successfully that the rolling bearing of Invention Example 5 was subjected to smaller stress compared with the rolling bearings of Comparative Examples 1 and 2. Application of reduced stress to the outer race 4 as described above is believed to be attributed to the excellent damper effects of the lubricant composition.

As is readily envisaged from the contents of the table which tabulates the results of Experiment 1, use of a lubricant composition—in which the kinematic viscosity of a base oil is 60 cSt and a thickener formed of a urea compound is contained in an amount of 18 wt. % or more—does not develop any change in texture which may lead to occurrence of premature flaking on the outer-race raceway 3.

Experiment 2

A description will next be made of an experiment which was conducted to confirm effects of the content of oxygen in the steel making up at least one race, in other words, the level of impurities in the steel, that is, the purity of the steel on the life of a bearing. To eliminate any influence which elements other than the property of each raceway surface may affect the results of the experiment, thrust ball bearings were used as samples. Employed were, as a comparative sample, a thrust ball bearing produced by carburizing a steel (JIS SCr420) whose oxygen content was 9 ppm and, as an invention sample, a thrust ball bearing produced by carburizing the steel (JIS SCr420) whose oxygen content was 6 ppm.

Those comparative samples and the invention sample were individually combined with balls so that thrust ball bearings were constructed. Each of those thrust ball bearings was mounted on a thrust life testing machine and its life was measured under the following conditions:
Maximum Hertzian stress: 500 kgf/mm$^2$
Revolution speed (N): 1,000 rpm
Lubricant: Turbine lubricant (#68)
Temperature: 125°–130° C.

Figure 3:
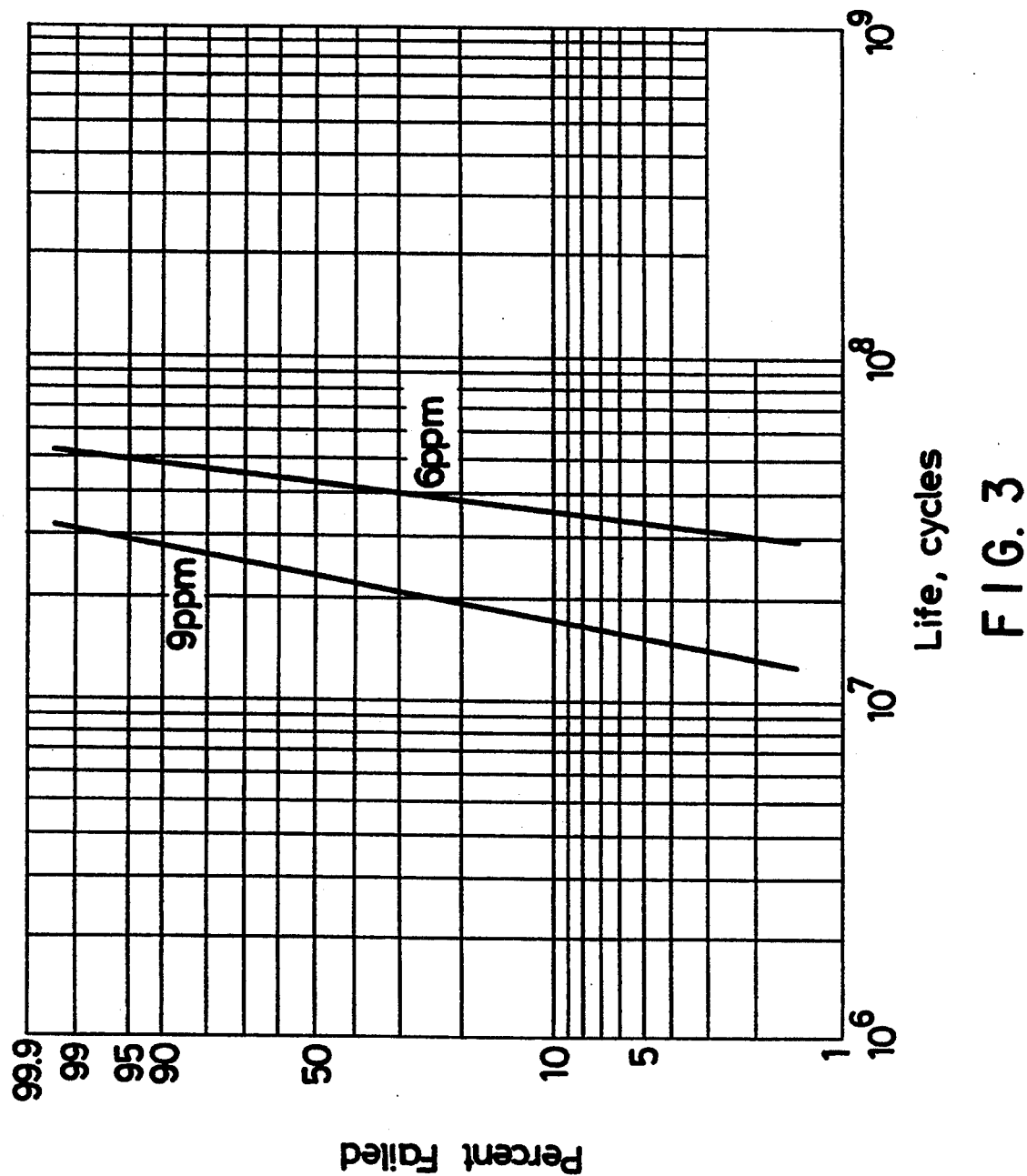
FIG. 3 is a graph showing the results of a second experiment.

The results of the above experiment are shown on a Weibull chart of FIG. 3. As is evident from FIG. 3, the life of the invention product is longer so that the effects available from limiting the oxygen content of steel to 6 ppm or lower have been confirmed.

It is necessary to harden by heat treatment at least a raceway surface of at least one of the races which constitute a rolling bearing according to the present invention. As the heat treatment for hardening the raceway surface as described above, the conventional standard heat treatment (so-called "whole quench hardening") can be applied. Application of special thermal hardening treatment such as carburization, carbonitriding or induction hardening, however, makes it possible to further improve the durability of the rolling bearing. A description will hereinafter be made of Experiment 3 in which effects of those special thermal hardening treatments on the durability of rolling bearings were investigated.

Experiment 3

Like Experiment 2 described above, thrust ball bearings were used as samples in this Experiment. As a comparative sample, a thrust ball bearing produced by subjecting JIS SUJ2 (bearing steel) to whole quench hardening was used. As races subjected to special thermal hardening, those obtained by subjecting JIS SCr420 to carburization were used.

Those races were combined with balls, respectively, so that thrust ball bearings were constructed. Each of those thrust ball bearings were each mounted on a thrust life testing machine and its life was measured under the following conditions:
Maximum Hertzian stress: 560 kgf/mm$^2$
Revolution speed (N): 3,000 rpm
Lubricant: Turbine lubricant (#150)
Temperature: 125°–130° C.

Figure 4:
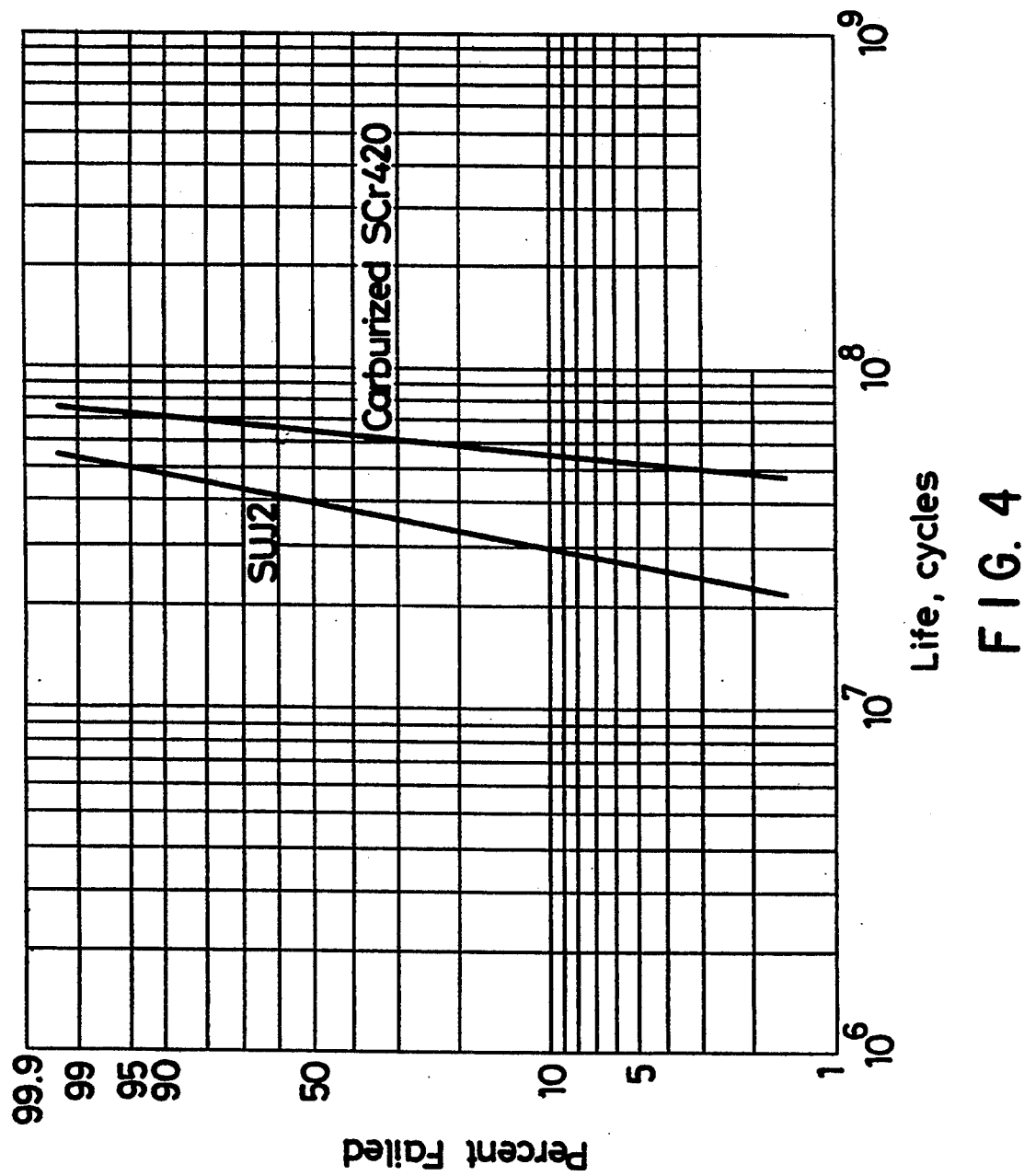
FIG. 4 is a graph depicting the results of a third experiment.

The results of the above experiment are shown on a Weibull chart of FIG. 4. As is evident from FIG. 4, the life of the carburized races was longer than that of the comparative product so that the effects available from heat-treating and hardening a raceway surface by carburization have been confirmed. When surface-hardening heat treatment is applied by carburization to a raceway surface to be subjected to complex loading, carbon atoms are caused to diffuse in the raceway surface so that the carbon atoms form a solid solution with the steel forming the raceway surface. The content of retained austenite in the steel is thus increased to reinforce the raceway surface and, at the same time, residual compressive stress is developed in the raceway surface, thereby making it possible to prevent premature flaking of the raceway surface.

In each of the Experiments described above, in order to mount the rolling bearing according to this invention on the alternator, the inner race 2 was fitted and fixed on the steel-made drive shaft and the outer race 4 was fitted and fixed in the aluminum-made housing. The present invention can also be applied when, to mount the rolling bearing according to the present invention on the part of an electromagnetic clutch of a compressor, the inner race 2 is fitted and fixed on an aluminum-made drive shaft and the outer race 4 is fitted and fixed in a steel- or aluminum-made pulley. Further, this invention is not limited to ball bearings but can also be applied to roller bearings including needle bearings.

What is claimed is:

1. In a rolling bearing compound of an outer race having an inner-race raceway on an outer peripheral wall thereof, an outer race having an outer-race raceway on an inner peripheral wall thereof, a plurality of rolling elements interposed for rotation between the outer-race raceway and the inner race, and a lubricant composition filled in a space, which is defined between the inner-race raceway and the outer-race raceway, at a position where the plurality of rolling elements are disposed, the improvement wherein:
   (a) at least one of the inner-race and outer-race raceways is made of steel having an oxygen content not higher than 6 ppm;
   (b) at least a raceway surface of said at least one raceway has been hardened by heat treatment;
   (c) the lubricant composition comprises as a base oil a synthetic lubricant having a kinematic viscosity of 60–160 cSt at 40° C.; and
   (d) the lubricant composition further comprises 18–28 wt. % of a thickener which comprises a polyurea compound.

2. In a rolling bearing composed of an outer race having an inner-race raceway on an outer peripheral wall thereof, an outer race having an outer-race raceway on an inner peripheral wall thereof, a plurality of rolling elements interposed for rotation between the outer-race raceway and the inner race, and a lubricant composition filled in a space, which is defined between the inner-race raceway and the outer-race raceway, at a position where the plurality of rolling elements are disposed, the improvement wherein:
   (a) at least one of the inner-race and outer-race raceways is made of steel having an oxygen content not higher than 6 ppm;
   (b) at least a raceway surface of said at least one raceway has been hardened by heat treatment;
   (c) the lubricant composition comprises as a base oil a synthetic lubricant; and
   (d) the lubricant composition further comprises 18–28% of a thickener which comprises a polyurea compound.

* * * * *